United States Patent Office 2,771,774
Patented Nov. 27, 1956

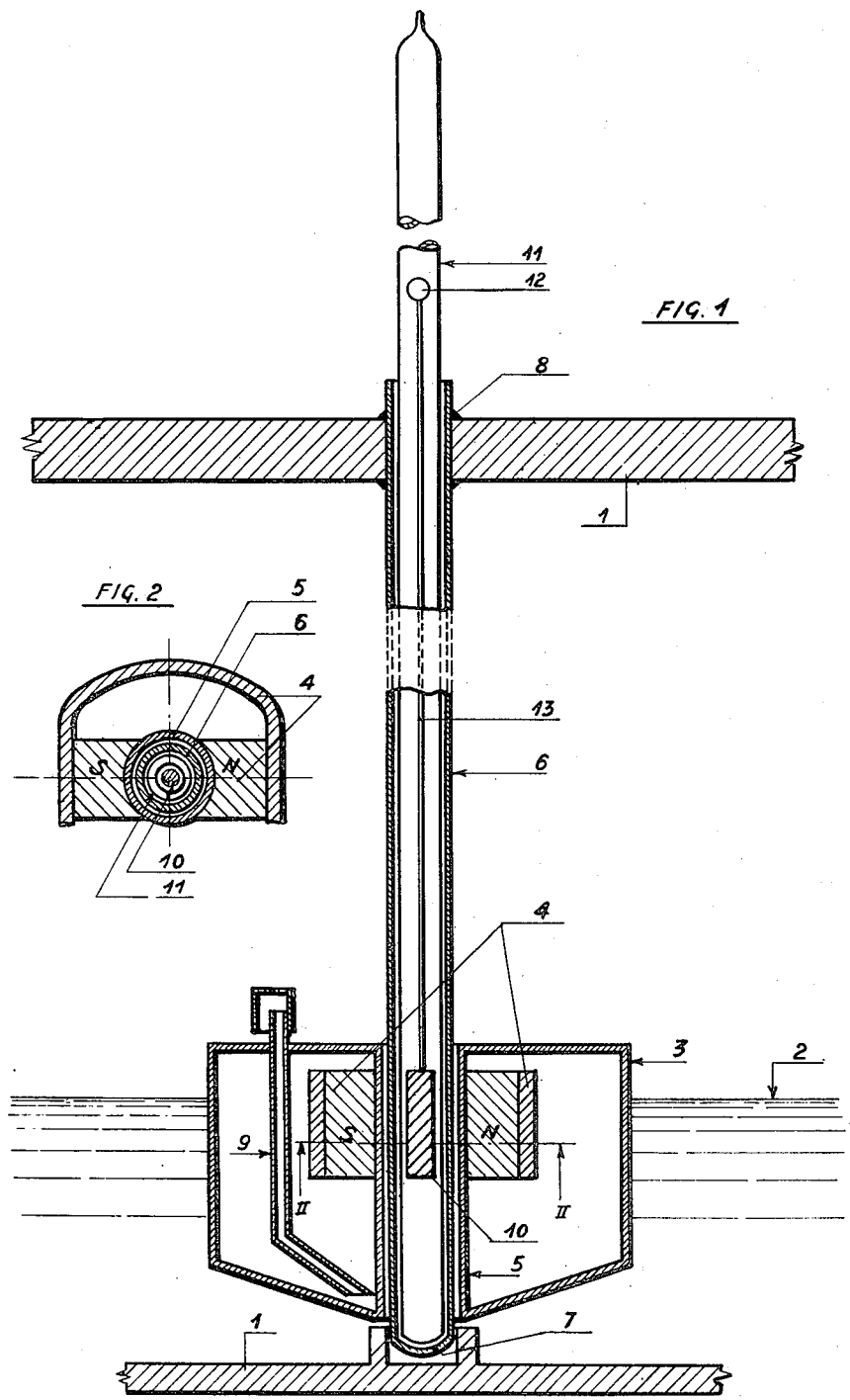

2,771,774

LEVEL GAUGE FOR ENCLOSED PRESSURE VESSELS

Eraldo Fornasieri, Milan, Italy, assignor to Montecatini, società generale per l'Industria Mineraria e Chimica, a corporation of Italy Application February 8, 1954, Serial No. 408,959

Claims priority, application Italy February 12, 1953

3 Claims. (Cl. 73—319)

This invention relates to a float-controlled gauge for indicating or signalling the level of liquid contained in an enclosed pressure tank.

Such gauges require means for transmitting to the outside of the pressure tank the displacements of the float following the changes of the liquid level within the enclosed vessel; and difficulties have been encountered with such transmitting devices particularly in the case of high or very high tank pressures. As a rule, the known level gauges require mechanical or electrical inleads that pass through the wall of the tank and require pressure seals apt to cause gas or liquid leakage especially when the liquid is under high pressure.

It is an object of the invention to provide a level indicator, generally of the above-mentioned type, that can be applied at any pressure and combines a simple and reliable design with greatest safety from leakages and breaks while also affording an accurate level measurement.

To this end, the invention provides a level gauge wherein the transmission from within to the outside of an enclosed, liquid-containing vessel comprises a magnetic coupling between a floating body following the changes of liquid level in the vessel, and a ferromagnetic body of small mass outside the vessel, the magnetic coupling being effective through the pressure-tight and nonmagnetic wall of a tube, preferably of stainless steel.

Other objects and advantages as well as more specific features of the invention will be apparent from the following description in conjunction with the accompanying drawing showing schematically an embodiment of a pressure gauge according to the invention in sectional representation.

Fig. 1 is a front elevation in section of the preferred embodiment of my invention;

Fig. 2 is a cross-section of the embodiment of Fig. 1 taken along the section line II—II of Fig. 1.

As illustrated, a tank 1 under pressure contains a variable quantity of liquid 2 whose changes in level are to be indicated outside the tank or are to control an indicating, signalling, recording or controlling operation. A float 3 consisting of a hollow body of non-magnetic material, such as stainless steel, aluminum, synthetic plastic or the like, contains a permanent magnet 4. Disposed between the two pole faces of magnet 4 is a cylinder 5 that traverses the float body and is sealed against the interior of that body. Cylinder 5 glides along a pressure-resistant guide tube 6 extending upwardly from the inside to the outside of the tank 1. Tube 6 has a closed end at 7 and is tightly sealed at 8 through the top of tank 1.

A siphon tube 9 extending from the bottom of float 3 upwardly to the outside of the float, serves to equalize pressure and to suction off any liquid that may have penetrated into the float, the suction effect being due to whatever minute pressure changes may occur in the tank.

The guide tube 6 may have an inner diameter of 5 to 20 millimeters or more. It is preferably made of stainless steel, aluminum or another nonmagnetic metal or alloy, and, if desired may be enameled or coated with ebonite or other protective material. The tube 6 forms a nonmagnetic wall through which the permanent magnet 4 acts upon the ferromagnetic body 10. Body 10 is freely movable within a sealed glass tube 11 inserted into the metal tube 6. Glass tube 11 is sufficiently long to project upwardly out of tube 6 a distance longer than the range of level-responsive float movement.

An indicator member 12 located in the projecting portion of glass tube 11 and visible from the outside of the tank is connected with the ferromagnetic body 10 by a metal or glass wire 13. Member 12 may consist of a colored glass bead, a pellet of phosphorescent material, or any other substance best suitable for the particular indicating or controlling operation desired.

While the entire travel path of the ferromagnetic body 10 is enclosed within the metal tube 6, the path traveled by the visible member 12 extends completely within the upper portion of the glass tube 11 emerging from the tube 6.

The glass tube 11 is sealed against the ambient atmosphere and is either evacuated or filled with an inert gas for protecting the movable assembly from excessive friction as well as from corrosion or damage by contact with extraneous bodies.

If desired, the level gauge may be used for controlling an electric indicating, control or regulating circuit, for instance a circuit that in turn controls the liquid supplied to the tank so as to maintain the quantity of liquid in the tank between desired minimum and maximum values. While such a control may be effected by photoelectric means to whose beam of light the member 12 is exposed when reaching the lowermost and uppermost limit positions, it is also possible to provide the glass tube 11 at the proper places with electric contacts, preferably mercury contacts, to be actuated by the member 12 when it reaches the maximum and minimum positions, respectively. Such contacts may be directly connected with an electric current line. The device, therefore, readily affords the possibility of controlling electric circuits at the outside of the pressure vessel in dependence upon the liquid level in the tank so that an indication of the level or a level-responsive control operation can be obtained at any desired remote distance from the tank.

A level indicator according to the invention further affords a high degree of measuring accuracy with structural means of utmost simplicity and reliability, the reading accuracy being equivalent to that obtainable with the conventional level gauges hydraulically communicating with the interior of the vessel.

Further advantages of level gauges according to the invention are the following:

(1) Complete safety as regards breakage. This is due to the fact that a metallic tube of small diameter is the only pressure-resistant piece.

(2) High operating reliability. Even if the float or its magnet are subjected to high acceleration, for instance when manipulating these parts during installation, inspection or repair, no interruption of the magnetic connection with the ferromagnetic body occurs so that the movable assembly within the glass tube cannot drop onto the bottom of the glass tube.

(3) A strikingly simple construction realizable in any workshop without other than conventional equipment, whereby the cost of the device is lower than that of a conventional low-pressure level gauge.

(4) Easy replacement of the glass tube in the event of damage. The tube can be removed and replaced by another one in the same manner as a thermometer (5) The gauge level is suitable for large level amplitudes, for instance, larger than 1 meter.

(6) The level gauge lends itself to measurements in vessels of very high pressure, for instance, thousands of atmospheres.

It will be obvious by those skilled in the art, upon a study of this disclosure, that as to design details, the invention permits of various alterations and modifications without departure from the essence of the invention and within the scope of the claims annexed hereto.

I claim:

1. In combination with an enclosed pressure vessel for a variable quantity of liquid, a level gauge comprising a hollow float of non-magnetic material and generally annular shape having a cylindrical inner wall portion, a pressure-resistant metal tube of non-magnetic material extending from the outside downwardly into said tank, said tube being upwardly open and having its interior sealed against the interior of said tank, said cylindrical wall portion of said float surrounding said tube for guidance of said float along said tube, a permanent magnet in said float having two poles adjacent said cylindrical wall portion at diametrically opposite sides thereof, a tube of transparent material coaxially disposed in said metal tube and of greater length than said metal tube so as to have a portion projecting upwardly beyond said metal tube, a magnetizable body of slight mass movably disposed in said transparent tube between said magnet poles to magnetically follow the level-responsive displacements of said float, an indicator member joined with said body in a fixed axial distance therefrom and having a travel path completely within said portion of said transparent tube so that said member is visible from the outside in any of its positions.

2. A level gauge for an enclosed pressure vessel for a variable quantity of liquid, comprising a float of non-magnetic material disposed in said vessel and having a hollow extending through said float from the top to the bottom thereof, a pressure-resistant metal tube of non-magnetic material extending from the outside of said tank downwardly into said tank and through said hollow of said float for guiding said float for level-responsive movement, said tube being upwardly open and having its interior sealed against the interior of said tank, a permanent magnet fixed to said float and having respective poles facing said hollow at opposite sides respectively to produce a magnetic field across said tube, a glass tube coaxially disposed in said metal tube and having a transparent portion extending upwardly out of said metal tube, a magnetizable body movable in said glass tube and located in said field to magnetically follow the level-responsive movements of said float, an indicator member and a rod element joining said member with said body in said glass tube, said member having a path of indicating travel located in said transparent portion, and said glass tube being sealed and having an interior space conditioned for reduced friction and protection from corrosion of said body.

3. A level gauge for an enclosed pressure vessel for a variable quantity of liquid, comprising a hollow float of non-magnetic material and generally annular shape having a cylindrical inner wall portion, a tube of non-magnetic material extending from the outside downwardly into said tank, said tube being upwardly open and having its interior sealed against the interior of said tank, said cylindrical wall portion of said float surrounding said tube for guidance of said float along said tube, a permanent magnet in said float having two poles adjacent said cylindrical wall portion at diametrically opposite sides thereof, a magnetizable body movable in said tube, and located between said poles to magnetically follow the level-responsive displacements of said float, and indicator means connected with said body and located outside and above said tube, said float being sealed against the interior of said tank and having a siphon tube extending within said float from the bottom of the float upwardly to the outside of the float for equalizing pressure differences between the interiors of float and tank and for suctioning from the float any accidentally entered liquid.

References Cited in the file of this patent

UNITED STATES PATENTS

| | | |
|---|---|---|
| 995,414 | Nault | June 13, 1911 |
| 1,363,139 | Mason | Dec. 21, 1920 |
| 1,560,318 | Reed | Nov. 3, 1925 |
| 1,723,172 | Huggins | Aug. 6, 1929 |
| 1,976,266 | Nagel | Oct. 9, 1934 |
| 2,032,370 | Larkin | Mar. 3, 1936 |